United States Patent
Hsu et al.

(10) Patent No.: US 10,893,258 B1
(45) Date of Patent: Jan. 12, 2021

(54) DISPLACEMENT-ORIENTED VIEW SYNTHESIS SYSTEM AND METHOD

(71) Applicants: National Taiwan University, Taipei (TW); Himax Technologies Limited, Tainan (TW)

(72) Inventors: Yu-Seng Hsu, Taipei (TW); Sih-Sian Wu, Taipei (TW); Liang-Gee Chen, Taipei (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 15/930,238

(22) Filed: May 12, 2020

(51) Int. Cl.
*H04N 13/268* (2018.01)
*H04N 13/128* (2018.01)
*G06T 3/00* (2006.01)
*G06T 5/50* (2006.01)
*H04N 13/122* (2018.01)
*H04N 13/00* (2018.01)

(52) U.S. Cl.
CPC ......... *H04N 13/268* (2018.05); *G06T 3/0093* (2013.01); *G06T 5/50* (2013.01); *H04N 13/122* (2018.05); *H04N 13/128* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 2015/0201176 A1* | 7/2015 | Graziosi | H04N 13/243 13/243 |
| 2016/0150208 A1* | 5/2016 | Li | H04N 13/111 382/154 |
| 2019/0304164 A1* | 10/2019 | Zhang | G06T 3/0093 |

* cited by examiner

*Primary Examiner* — Christopher Braniff
(74) *Attorney, Agent, or Firm* — Donald E. Stout; Stout, Uxa & Buyan, LLP

(57) ABSTRACT

A displacement-oriented view synthesis system includes a plurality of three-dimensional (3D) warping devices each coupled to receive at least one input image captured from a corresponding reference view, and each performing 3D warping on the input image to generate at least one corresponding warped image in a target view; a view blending device coupled to receive the warped images, and performing view blending on the warped images to generate at least one blended image in the target view; and an inpainting device coupled to receive the blended image, and performing inpainting on the blended image to generate a synthesized image in the target view. The inpainting is performed according to a difference displacement between frames of different views.

12 Claims, 4 Drawing Sheets

DISPLACEMENT-ORIENTED VIEW SYNTHESIS SYSTEM AND METHOD

BACKGROUND OF THE INVENTION

1. Field of the Invention

The present invention generally relates to view synthesis, and more particularly to a displacement-oriented view synthesis.

2. Description of Related Art

View synthesis is a technique for creating new (or virtual) views of a specific subject according to a number of images taken from reference views. View synthesis may be adapted to a variety of applications, such as virtual reality or free viewpoint television, to allow the user to interactively control the viewpoint and generate virtual views of a dynamic scene from any 3D position.

Conventional view synthesis adopts depth image based rendering (DIBR) techniques. However, conventional view synthesis suffers from induced artifacts such as disocclusion, ghost contour and pinholes effect. Specifically, regions that cannot be seen from the reference view but appear in the virtual view due to discontinuities between the foreground objects and the background are called disocclusion. Ghost contour may be produced when foreground boundary pixels are mistook as background pixels and are then mapped to wrong positions.

Image warping is a process of digitally manipulating and distorting an image, and may be used for correcting image distortion. There are mainly two ways of performing image warping: forward warping that applies forward mapping to map from original images to warped images; and backward (or reverse) warping that applies backward mapping to map from warped images to original images. Conventional three-dimensional (3D) image warping methods, however, cannot perform effectively or economically due to complex coordination transformation.

Inpainting is a process of replacing lost or corrupted parts of an image. Inpainting may be performed at the pixel level or the patch level. For example, exemplar-based inpainting may search for similar patches in a nearby source region of the image to fill holes in the image, and can reduce blurring artifacts as commonly caused by pixel-level inpainting. However, conventional inpainting methods usually produce odd results as the holes are filled with patches that are improperly searched.

For the reason that conventional view synthesis cannot correctly and effectively create new views, a need has arisen to propose a novel view synthesis scheme to overcome drawbacks of the conventional view synthesis methods.

SUMMARY OF THE INVENTION

In view of the foregoing, it is an object of the embodiment of the present invention to provide a displacement-oriented view synthesis system and method capable of effectively and correctly creating new views.

According to one embodiment, a displacement-oriented view synthesis system includes three-dimensional (3D) warping devices, a view blending device and an inpainting device. Each 3D warping device receives at least one input image captured from a corresponding reference view, and performs 3D warping on the input image to generate at least one corresponding warped image in a target view. The view blending device receives the warped images, and performs view blending on the warped images to generate at least one blended image in the target view. The inpainting device receives the blended image, and performs inpainting on the blended image to generate a synthesized image in the target view. The inpainting is performed according to a difference displacement between frames of different views.

DETAILED DESCRIPTION OF THE INVENTION

Figure 1:
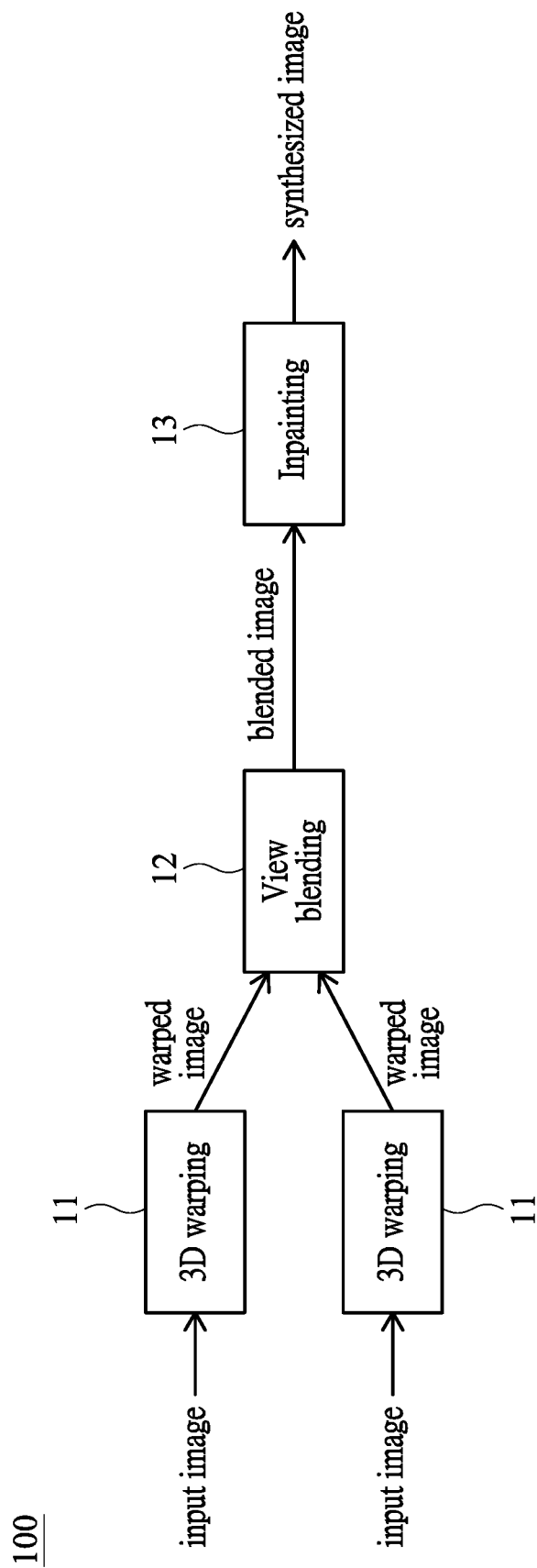
FIG. 1 shows a block diagram illustrating a displacement-oriented view synthesis system according to one embodiment of the present invention.
Figure 2:
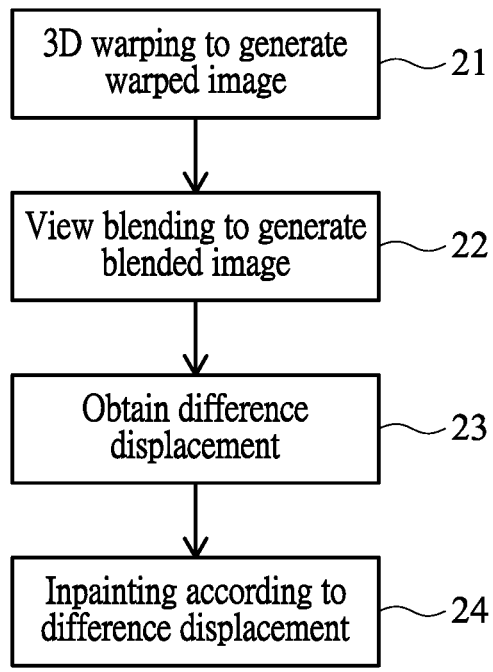
FIG. 2 shows a flow diagram illustrating a displacement-oriented view synthesis method according to one embodiment of the present invention.

FIG. 1 shows a block diagram illustrating a displacement-oriented view synthesis system 100 for single or multiple RGBD (red, green, blue plus depth) cameras according to one embodiment of the present invention, and FIG. 2 shows a flow diagram illustrating a displacement-oriented view synthesis method 200 for single or multiple RGBD cameras according to one embodiment of the present invention. The blocks of the view synthesis system 100 and the steps of the view synthesis method 200 may be implemented by hardware, software or their combination, for example, performed in a digital image processor. The view synthesis system 100 and method 200 may be adapted to applications such as navigation, manipulation, semantic mapping and telepresence.

The view synthesis system 100 of the embodiment may include a plurality of three-dimensional (3D) warping devices 11 each coupled to receive at least one input image (e.g., an input texture image and an associated input depth image) captured from a corresponding reference view, and each configured to perform 3D warping on the input image to generate at least one corresponding warped image (e.g., a warped texture image and an associated warped depth image) in a target (or virtual) view (step 21). In one exemplary embodiment, two 3D warping devices 11 are adopted to receive a left image captured from a left view and a right image captured from a right view, thereby generating a left warped image and a right warped image, respectively. In the embodiment, the 3D warping device 11 may adopt 3D backward warping that maps from the warped image to the input image.

The view synthesis system 100 may include a view blending device 12 coupled to receive the warped images (from all the warping devices 11), and configured to perform view blending, for example, by a weighted average technique, on the warped images to generate at least one blended image (e.g., a blended texture image and an associated blended depth image) in the target view (step 22). Weights could be appearance differences between the target view and the reference views, the geometry distance between those views or other indexes. View blending may be performed by other methods such as winner-take-all.

The view synthesis 100 may include an inpainting device 13 coupled to receive the blended image, and configured to perform inpainting or hole filling on the blended image to generate a synthesized image in the target view. According to one aspect of the embodiment, the inpainting device 13 may perform (displacement-aided) inpainting or hole filling according to a difference displacement, which helps guide inpainting direction to find out more correct patches to fill the holes.

Specifically, a foreground displacement associated with a foreground object (between frames of different views) is determined, and a background displacement associated with a background object (between the frames of different views) is determined. Next, a difference displacement is obtained by subtracting the background displacement from the foreground displacement (step 23).

Figure 3:
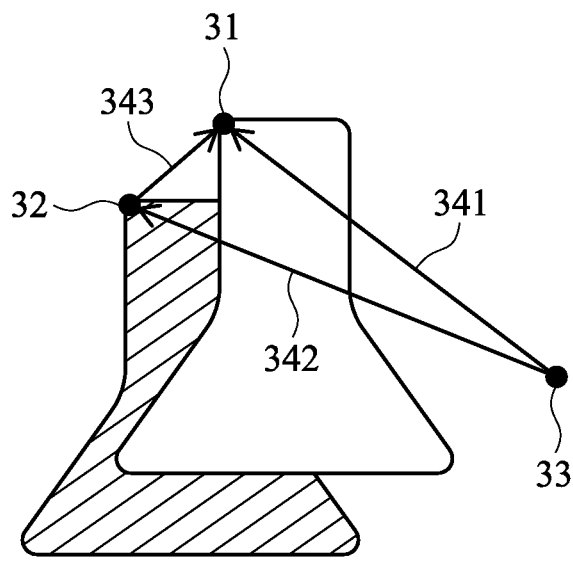
FIG. 3 shows an example of determining a difference displacement from a group of corresponding points.

FIG. 3 shows an example of determining a difference displacement 343 from a group of corresponding points composed of a first point 31, a second point 32 and a third point 33. To be specific, the first point 31 is a foreground-associated point in a first view, the second point 32 is a background-associated point in the first view, and the third point 33 is a point in a second view. The first view is the target view with holes causing by disocclusion and the second view is a reference/input view. A foreground displacement 341 is constructed by connecting the first point 31 with the third point 33, a background displacement 342 is constructed by connecting the second point 32 with the third point 33, and a difference displacement 343 is obtained by subtracting the background displacement 342 from the foreground displacement 341.

Subsequently, the inpainting device 13 may perform inpainting by using the difference displacement as guidance for search direction (step 24). For example, only pixel(s) or patch(es) along the difference displacement are used to perform inpainting to fill holes. As the difference displacement of the embodiment can provide a proper inpainting direction in disocclusion, which is an area between a foreground edge and a background edge (e.g., hatched area as exemplified in FIG. 3), proper patches may be found to fill the holes while performing inpainting. To the contrary, as conventional inpainting only considers RGB image to find patches for filling the holes, an incorrect search direction may ordinarily be obtained, thereby usually resulting odd outcomes.

Figure 4A:
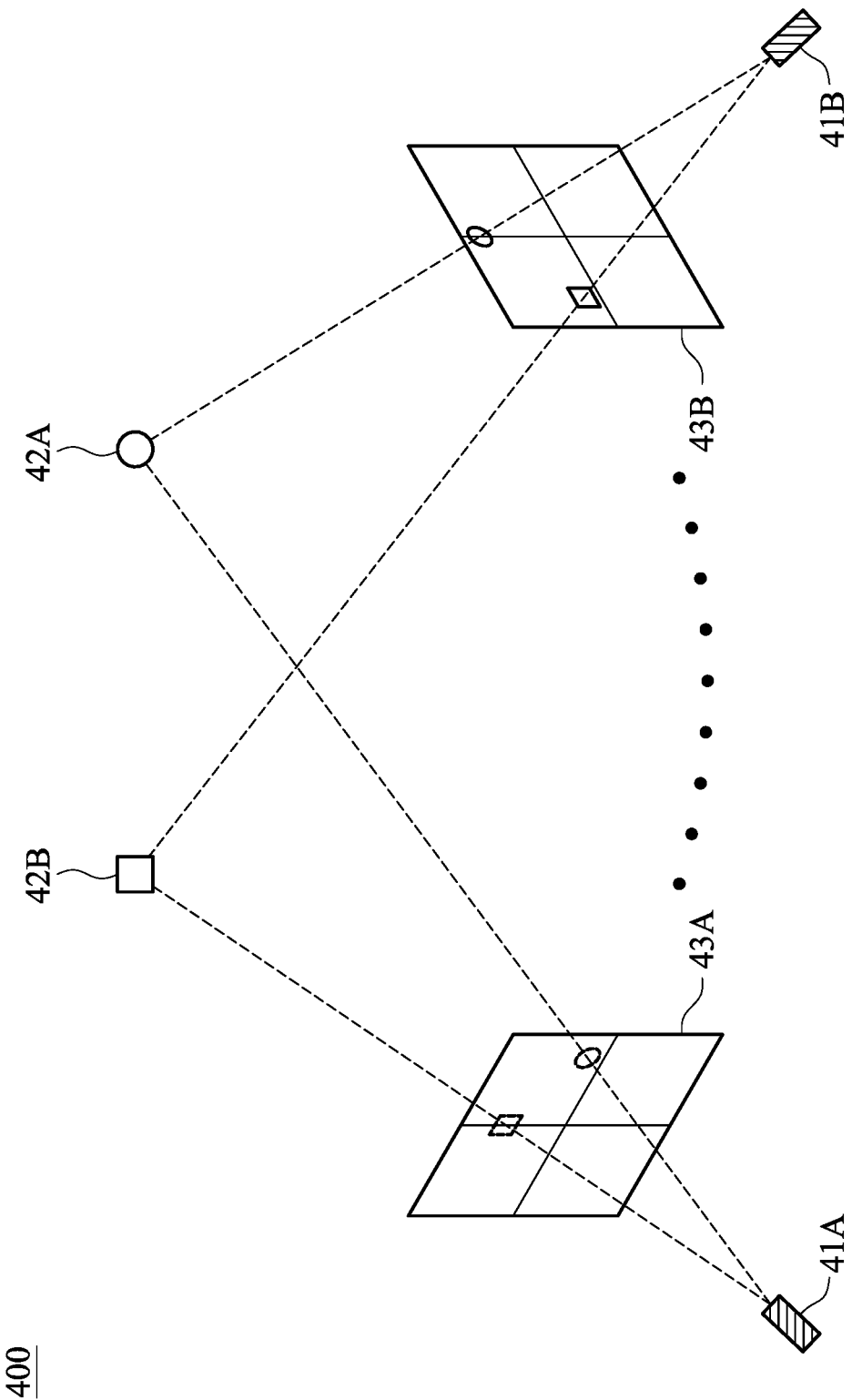
FIG. 4A shows a schematic diagram illustrating a setup adaptable for displacement-oriented view synthesis system for multiple cameras.
Figure 4B:
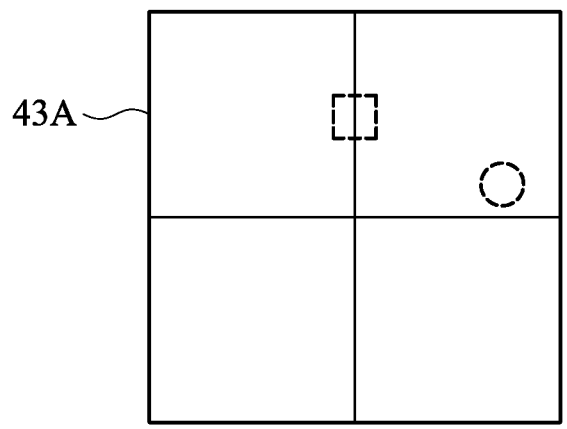
FIG. 4B shows an image captured by the first camera.
Figure 4C:
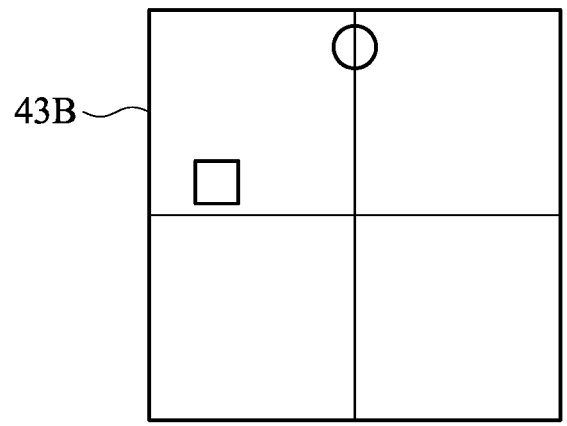
FIG. 4C shows an image captured by the second camera.
Figure 4D:
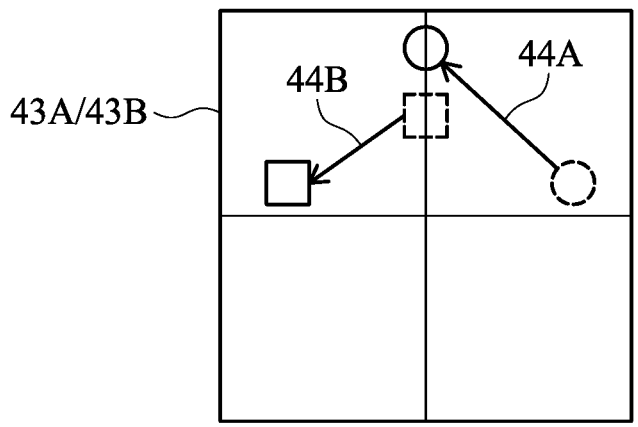
FIG. 4D shows a composite image composed of the images of FIG. 4B and FIG. 4C.

FIG. 4A shows a schematic diagram illustrating a setup 400 adaptable for displacement-oriented view synthesis system for multiple cameras (e.g., first camera 41A and second camera 41B) disposed in different reference views for capturing images of objects (e.g., first object 42A and second object 42B). FIG. 4B shows an image 43A captured by the first camera 41A, FIG. 4C shows an image 43B captured by the second camera 41B, and FIG. 4D shows a composite image 43A/43B composed of the image 43A of FIG. 4B and the image 43B FIG. 4C. According to the embodiment as set forth above, a difference displacement 44A associated with the first object 42A and a difference displacement 44B associated with the second object 42B may be obtained, and inpainting may be performed by using the difference displacements 44A and 44B as guidance for search direction.

It is noted that the difference displacements corresponding to a plurality of points of a scenic object may be subject to filtering (e.g., by a median filter), and the view blending device 12 may perform weighted averaging according to the result of filtering as set forth above. Moreover, the 3D warping device 11 may perform 3D warping according to the difference displacements.

Although specific embodiments have been illustrated and described, it will be appreciated by those skilled in the art that various modifications may be made without departing from the scope of the present invention, which is intended to be limited solely by the appended claims.

What is claimed is:

1. A displacement-oriented view synthesis system, comprising:
   a plurality of three-dimensional (3D) warping devices each coupled to receive at least one input image captured from a corresponding reference view, and each performing 3D warping on the input image to generate at least one corresponding warped image in a target view;
   a view blending device coupled to receive the warped images, and performing view blending on the warped images to generate at least one blended image in the target view; and
   an inpainting device coupled to receive the blended image, and performing inpainting on the blended image to generate a synthesized image in the target view;
   wherein the inpainting is performed according to a difference displacement between frames of different views;
   wherein the difference displacement is obtained by the following steps:
      determining a foreground displacement associated with a foreground object, the foreground displacement being constructed by connecting a foreground-associated point in the target view with a corresponding point in the reference view;
      determining a background displacement associated with a background object, the background displacement being constructed by connecting a background-associated point in the target view with the corresponding point in the reference view; and
      obtaining the difference displacement by subtracting the background displacement from the foreground displacement.

2. The system of claim 1, wherein the 3D warping device adopts backward warping that maps from the warped image to the input image.

3. The system of claim 1, wherein the view blending is performed by a weighted average or winner-take-all technique.

4. The system of claim 1, wherein holes in an area between a foreground edge and a background edge are filled by pixels or patches searched along the difference displacement.

5. The system of claim 1, wherein the at least one input image comprises an input texture image and an associated input depth image.

6. The system of claim 1, further comprising:
   a plurality of cameras each capturing the at least one input image from the corresponding reference view.

7. A displacement-oriented view synthesis method, comprising:
   receiving a plurality of input images captured from corresponding reference views respectively;
   performing three-dimensional (3D) warping on the input images to respectively generate corresponding warped images in a target view;

performing view blending on the warped images to generate at least one blended image in the target view; and performing inpainting on the blended image to generate a synthesized image in the target view;

wherein the inpainting is performed according to a difference displacement between frames of different views;

wherein the difference displacement is obtained by the following steps:

determining a foreground displacement associated with a foreground object, the foreground displacement being constructed by connecting a foreground-associated point in the target view with a corresponding point in the reference view;

determining a background displacement associated with a background object, the background displacement being constructed by connecting a background-associated point in the target view with the corresponding point in the reference view; and obtaining the difference displacement by subtracting the background displacement from the foreground displacement.

8. The method of claim 7, wherein the step of performing the 3D warping adopts backward warping that maps from the warped image to the input image.

9. The method of claim 7, wherein the view blending is performed by a weighted average or winner-take-all technique.

10. The method of claim 7, wherein holes in an area between a foreground edge and a background edge are filled by pixels or patches searched along the difference displacement.

11. The method of claim 7, wherein the input image comprises an input texture image and an associated input depth image.

12. The method of claim 7, further comprising:

providing a plurality of cameras for capturing the plurality of input images from the corresponding reference views respectively.

* * * * *